(12) United States Patent
Brady

(10) Patent No.: US 12,568,995 B2
(45) Date of Patent: Mar. 10, 2026

(54) EDIBLE CAKE GLITTER

(71) Applicant: Faith Shayia Brady, Boise, ID (US)

(72) Inventor: Faith Shayia Brady, Boise, ID (US)

( * ) Notice: Subject to any disclaimer, the term of this patent is extended or adjusted under 35 U.S.C. 154(b) by 524 days.

(21) Appl. No.: 17/500,886

(22) Filed: Oct. 13, 2021

(65) Prior Publication Data

US 2022/0110349 A1      Apr. 14, 2022

Related U.S. Application Data

(60) Provisional application No. 63/091,289, filed on Oct. 13, 2020.

(51) Int. Cl.
| | |
|---|---|
| *A23L 15/00* | (2016.01) |
| *A23L 5/40* | (2016.01) |
| *A23L 29/231* | (2016.01) |
| *A23P 10/20* | (2016.01) |

(52) U.S. Cl.
CPC ................. *A23L 15/30* (2016.08); *A23L 5/40* (2016.08); *A23L 29/231* (2016.08); *A23P 10/20* (2016.08); *A23V 2002/00* (2013.01)

(58) Field of Classification Search
CPC .......... A23L 15/30; A23L 5/40; A23L 29/231; A23L 33/105; A23P 10/20; A23V 2002/00
See application file for complete search history.

(56) References Cited

PUBLICATIONS

Cake Central 2013, "Homemade Clear Glitter From Egg Whites", Jan. 2013, retrieved from the Internet: https://www.cakecentral.com/forum/t/751723/homemade-clear-glitter-from-egg-whites#post_7353441 (Year: 2013).*
Cake Central 2006, "New Edible Glitter", Nov. 2006, retrieved from the Internet: https://www.cakecentral.com/forum/t/50223/new-edible-glitter (Year: 2006).*
Baking Forums, "Edible Glitter", Dec. 2015, retrieved from the Internet: https://www.baking-forums.com/threads/edible-glitter.3295/ (Year: 2015).*
Ultimate Baker, "Edible Luster Dust", Jun. 2018, retrieved from the Internet: https://ultimatebaker.com/edible-luster-dust/ (Year: 2018).*

* cited by examiner

*Primary Examiner* — Emily M Le
*Assistant Examiner* — Tynesha L Mcclain
(74) *Attorney, Agent, or Firm* — Burdick Patents, P.A.; Sean D. Burdick; Colin L. Honan

(57) ABSTRACT

A method is provided for manufacturing edible glitter flakes for use as cake décor. The method prescribes steps for combining egg white with up to three secondary liquid ingredients of food coloring, food flavoring, and sweetener to form a homogeneous liquid mixture, and the mixture is poured into a pan to a depth of a desired thickness of the flakes, without causing substantial denaturation of the egg white. The mixture is dried to solid form, then shredded using a scraping blade to shed the flakes having the desired thickness. Edible dust is mixed throughout and adhered to the flakes to form a homogenous solid mixture having a light-reflecting quality.

20 Claims, 7 Drawing Sheets

20    10    14

<u>60</u>

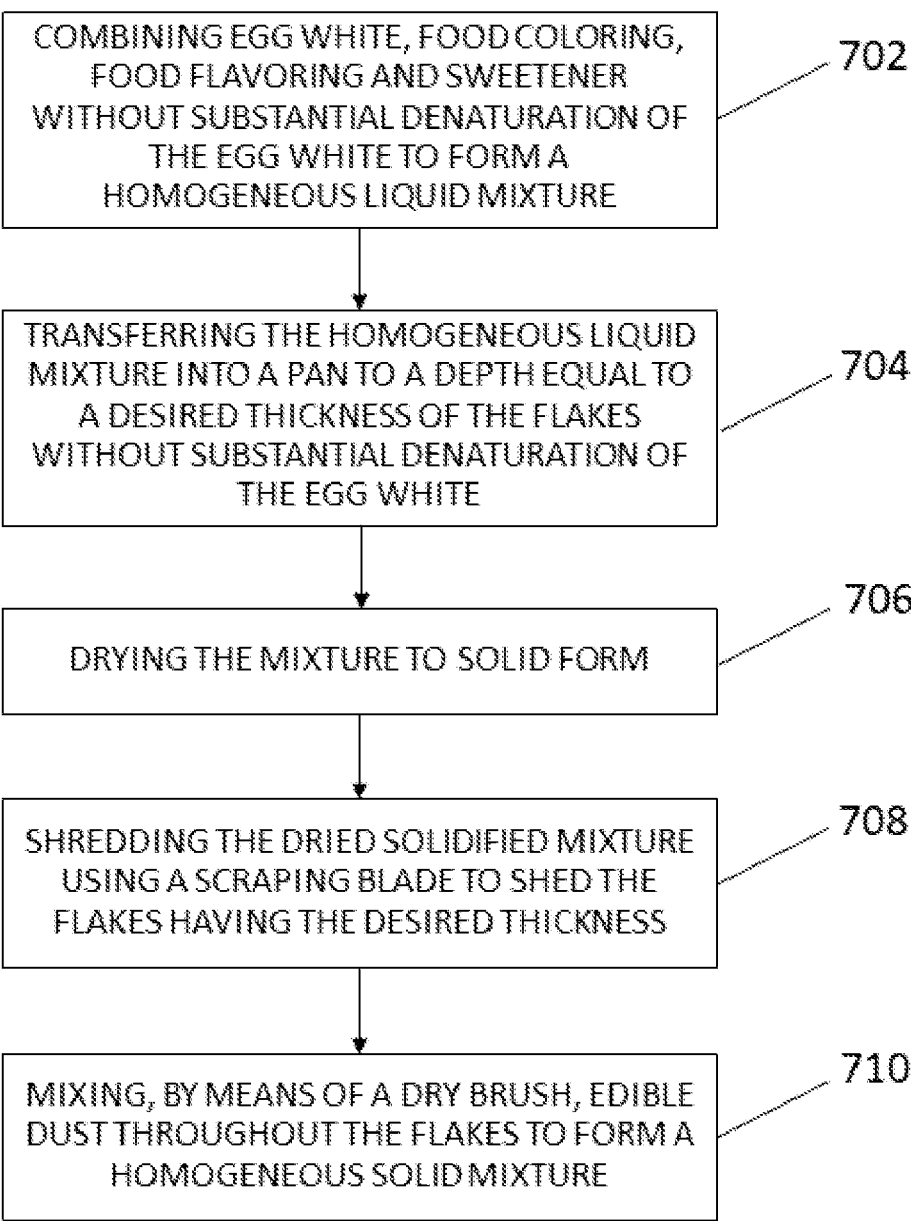

700

COMBINING EGG WHITE, FOOD COLORING, FOOD FLAVORING AND SWEETENER WITHOUT SUBSTANTIAL DENATURATION OF THE EGG WHITE TO FORM A HOMOGENEOUS LIQUID MIXTURE — 702

TRANSFERRING THE HOMOGENEOUS LIQUID MIXTURE INTO A PAN TO A DEPTH EQUAL TO A DESIRED THICKNESS OF THE FLAKES WITHOUT SUBSTANTIAL DENATURATION OF THE EGG WHITE — 704

DRYING THE MIXTURE TO SOLID FORM — 706

SHREDDING THE DRIED SOLIDIFIED MIXTURE USING A SCRAPING BLADE TO SHED THE FLAKES HAVING THE DESIRED THICKNESS — 708

MIXING, BY MEANS OF A DRY BRUSH, EDIBLE DUST THROUGHOUT THE FLAKES TO FORM A HOMOGENEOUS SOLID MIXTURE — 710

FIG. 7

EDIBLE CAKE GLITTER

RELATED APPLICATIONS

This application claims priority to U.S. Provisional Application 63/091,289 filed Oct. 13, 2020 and fully incorporated herein by reference.

BACKGROUND OF THE INVENTION

Field of the Invention

The present invention relates generally to cake decorating materials, and more specifically to edible cake confetti and edible cake glitter.

Description of Related Art

Cake decorating has evolved into an elaborate art form for which specialized materials such as fondant, colored sprinkles, and other fanciful toppings have been developed to provide the decorator with a wide variety of options when designing artwork to grace the icing. Cake decorating materials can be broadly divided into two categories—edible and nonedible. Nonedible materials are often design props made of wood or plastic, such as statuettes of a bride and groom for placement onto a wedding cake. Edible materials can be further categorized into food edibles, such as sugar or soy based confections, and non-food edibles that have no nutritional value but are safe to consume, i.e. non-toxic.

Finely ground, colored sugar is perhaps the most familiar example of a food edible suitable for use as cake décor, to provide glitter or a confetti-like effect on the surface of cake icing. Many cake decorating artists avoid using these types of colored sugars, because under certain conditions their solubility can allow the food coloring to weep into the cake icing and blur an artistic design. Another example of an edible cake décor is "edible dust", which is a very fine power that has a light-reflecting quality. Edible dust is marketed by a number of makers, e.g. Bakell® Luster Dust, Wilton Pearl Dust™, etc. These edible dusts, however, are non-adhesive, and must be used with a paste or edible glue (such as tylose powder mixed with water) to make it adhere to a food product. Even so, the visual effect is a powder-coat, rather than having the appearance of confetti or sequins.

The Wilton Brands company also makes and markets a non-food edible cake décor called Edible Glitter™, which can be formed, for example, in the shape of stars. This product is approved for human consumption by the FDA; however, its two main ingredients—methyl cellulose and propylene glycol—are non-foods. Methyl cellulose, a thickener derived from cellulose, is non-digestible, tasteless, and water soluble. Propylene glycol is a synthetic, mainly tasteless, food additive used as an anti-caking agent and moisture absorber. Together these additives help to prevent the weeping of food coloring into cake icing; however, many consumers dislike the taste of such non-food edibles, which tends to be dominated by the bitterness of a third ingredient—the food coloring itself. Though such additives are harmless to ingest, many decorators prefer not to use non-food or nonorganic products on their cakes, for marketing reasons or for perceived health-related reasons.

What is needed is an edible, colored cake décor made from an organic food product that tastes good, that can be sprinkled onto cake icing, that has the form of sequins or confetti, and that doesn't allow color to weep onto the icing.

SUMMARY OF THE INVENTION

The present invention presents a process for making a cake décor product that is superior in form to similarly-named products colloquially known as edible cake glitter. The invention produces an albumen based food product in the form of finely ground or shredded edible confetti that is coated with a light-reflecting edible dust. The albumen, or egg white, while in liquid form and not substantially denatured may be colored, flavored, and/or sweetened as desired prior to drying, shredding, and mixing with edible dust to form the finished product.

In one embodiment, a method for manufacturing edible cake glitter includes the following salient steps. First, egg white is very lightly combined with one or more of food coloring, food flavoring, and sweetener to form a homogeneous liquid mixture without disrupting the integrity of the egg white that would cause substantial denaturation. Next, the mixture is dried until it achieves solid form. Next, the solidified mixture is then ground into flakes of similar size. In a further step, an edible dust may be added to the flakes, and then the ingredients mixed to form a homogeneous solid mixture. According to the invention, the main ingredients are combined in a ratio of about one dozen egg whites to between about ⅛ and about ¼ teaspoon of any of the food coloring, the food flavoring, and the sweetener.

In another embodiment, the process may include a step performed immediately after the combining step, wherein the homogeneous liquid mixture is poured into a container to a depth greater than a desired thickness of the confetti flakes that will form the edible cake glitter. In the grinding step, the solidified mixture is shredded using rotary blades. The speed or duration of rotation of the blades may be controlled to achieve the desired thickness or size of confetti flakes. In another embodiment, the process may include an alternative step performed immediately after the combining step, wherein the homogeneous liquid mixture is poured into a pan to a depth approximately equal to a desired thickness of the flakes. In the grinding step, the solidified mixture is shredded using a scraping blade. In these embodiments, the desired flake thickness may range from about 0.25 millimeters to about 2.0 millimeters.

In a more elaborate embodiment, a method for manufacturing edible glitter flakes according to the present invention includes steps for very lightly combining egg white, food coloring, food flavoring, and sweetener to form a homogeneous liquid mixture without disrupting the integrity of the egg white that would cause substantial denaturation; pouring the homogeneous liquid mixture into a pan to a depth approximately equal to a desired thickness of the flakes; drying the mixture to solid form; shredding the dried solidified mixture using a scraping blade to shed the flakes having the desired thickness; and mixing, by means of a dry brush, edible dust throughout the flakes to form a homogenous solid mixture. The ingredients are combined in a ratio of about one dozen egg whites to between ⅛ and ¼ teaspoon of each of the food coloring, the food flavoring, and the sweetener. The desired thickness of the flakes is between about 0.25 mm and about 2.0 mm.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 7 is a process flow diagram illustrating one embodiment of a method according to the invention for making edible cake glitter.

DETAILED DESCRIPTION OF THE INVENTION

The following disclosure presents exemplary embodiments for a process for making a cake décor product that is superior in form to similarly-named products colloquially known as edible cake glitter. The invention produces an albumen based food product in the form of finely ground or shredded edible confetti that is coated with a light-reflecting edible dust. The albumen, or egg white, while in liquid form and not substantially denatured may be colored, flavored, and/or sweetened as desired prior to drying, shredding, and mixing with edible dust to form the finished product.

According to the invention, during the manufacturing process it is essential to maintain the integrity of the albumen while the albumen is in a liquid phase. That is, whenever separating, pouring, or mixing liquid egg white, care must be taken to avoid substantial denaturation of the protein molecules of the albumen. Such denaturation breaks apart the natural bonding of the protein molecules, which causes loss of the self-adhesive property of the egg white. Throughout the disclosure, usage of terms such as "carefully" and "very lightly" and "mix very lightly" means that the egg white must be handled delicately to preserve its integrity and avoid denaturation.

Figure 1:
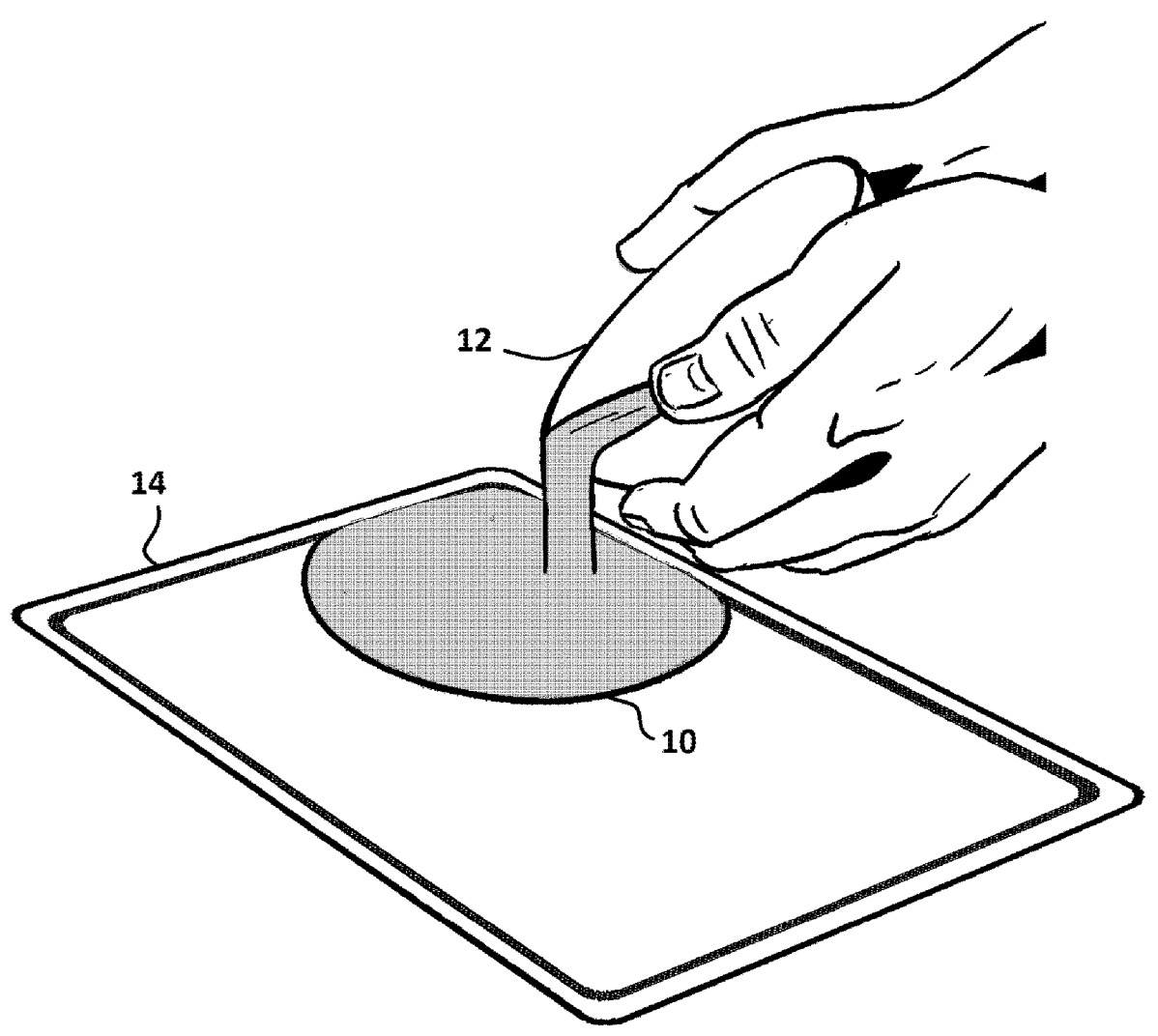
FIG. 1 is a perspective view illustrating a process step wherein a homogeneous liquid mixture is poured into a pan according to one embodiment of the invention for making edible cake glitter.

FIG. 1 shows a perspective view illustrating a process step wherein a homogeneous liquid mixture 10 is carefully poured from a mixing bowl 12 into a pan 14 according to one embodiment of the invention for making edible cake glitter. The base of the liquid consists of albumen or egg whites as a main ingredient, preferably fresh and at room temperature. Prior to pouring, a desired number of egg whites are separated from their yolks and carefully collected into the mixing bowl 12. Preferably, all of the chalazae are carefully removed prior to combining the egg white with secondary ingredients. Then one or more of the following secondary ingredients are mixed very lightly into the egg white to form a homogeneous liquid mixture: food coloring, food flavoring, and sweetener. It is essential that the integrity of the egg white bodies not be disrupted when very lightly mixing in these ingredients. That is, the egg white liquid should not be mechanically separated—each egg white body must maintain its gelling or self-adhesive quality, that is, its tendency to behave as a singular gel. Thus, no egg white used as an ingredient can be whipped, nor mixed with any strength or vigor that would destroy its self-adhesive property and thereby cause substantial denaturation of the egg white.

In an exemplary and non-limiting embodiment, a preferred ratio of egg white to any of the secondary ingredients is one dozen egg whites to between about one-eighth and about one-fourth of a teaspoon of each secondary ingredient. This ratio holds true whether one, two, or all three secondary ingredients are present in the mix. Preferably, each secondary ingredient is also provided in liquid form. By way of example, liquid food coloring made by the Americolor® Corp. and marketed as Amerimist™, liquid food flavoring made by Amoretti®, and liquid monkfruit extract sweetener made by Lakanto® may be used as the secondary ingredients. Many other commercially available liquid food colorings, flavorings, and sweeteners may also be used as the secondary ingredients without departing from the scope of the invention.

Figure 2:
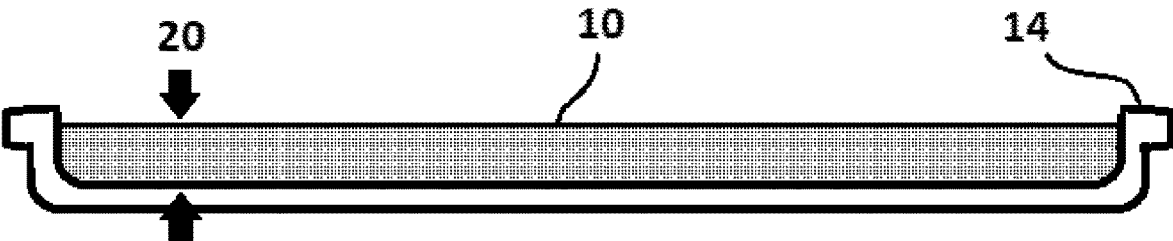
FIG. 2 is cross-sectional view of the pan of FIG. 1, showing the homogeneous liquid mixture poured, for drying, to a depth approximately equal to a desired thickness of a flake for edible cake glitter according to the invention.

FIG. 2 is cross-sectional view of the pan of FIG. 1, showing the homogeneous liquid mixture poured into the pan 14, and set for drying, to a depth 20 approximately equal to a desired thickness of a flake for edible cake glitter according to the invention. In one embodiment, the depth 20 is between about 0.25 mm and about 2.0 mm. The objective of this step is to prepare the homogeneous liquid mixture for drying, and to create a dried planar sheet of the mixture 10. In another embodiment, the depth 20 may be greater than a desired thickness of a flake. For example, rather than pouring the mixture 10 into a flat rectangular pan, the mixture 10 may be set into a container having greater depth, such as the bowl 12, and the mixture left there to dry, with the objective being to create a dried brick having dimensions in all directions that exceed a desired thickness of a flake.

An additional step may be necessary at this stage, prior to leaving the mixture 10 to dry, consisting of removing any bubbles that may have formed in the mixture. A tool such as a spoon, needle, or syringe can be used for this purpose, and care must be taken to avoid disrupting the integrity of the egg white.

The mixture 10 must now be dried. Drying the set mixture 10, whether in planar form or in the form of a brick, may be accomplished by allowing the mixture to sit in ambient temperature for a certain period of time, for example one to two days, until the mixture 10 hardens. Alternatively, or in addition, drying time may be reduced by exposing the set mixture 10 to air flow from a fan or other source of convection. When drying of the mixture 10 is complete, it is ready for shredding into flakes of confetti. The inventor has determined experimentally that preserving the natural integrity of egg white from separation through drying produces an albumen-based product that will yield confetti flakes of a desired quality when the dried mixture 10 is shredded. That is, the flakes themselves will be well-formed, retain their shape, and not easily disintegrate. These characteristics are not achieved when the egg white is substantially denatured in any step prior to shredding.

Figure 3:
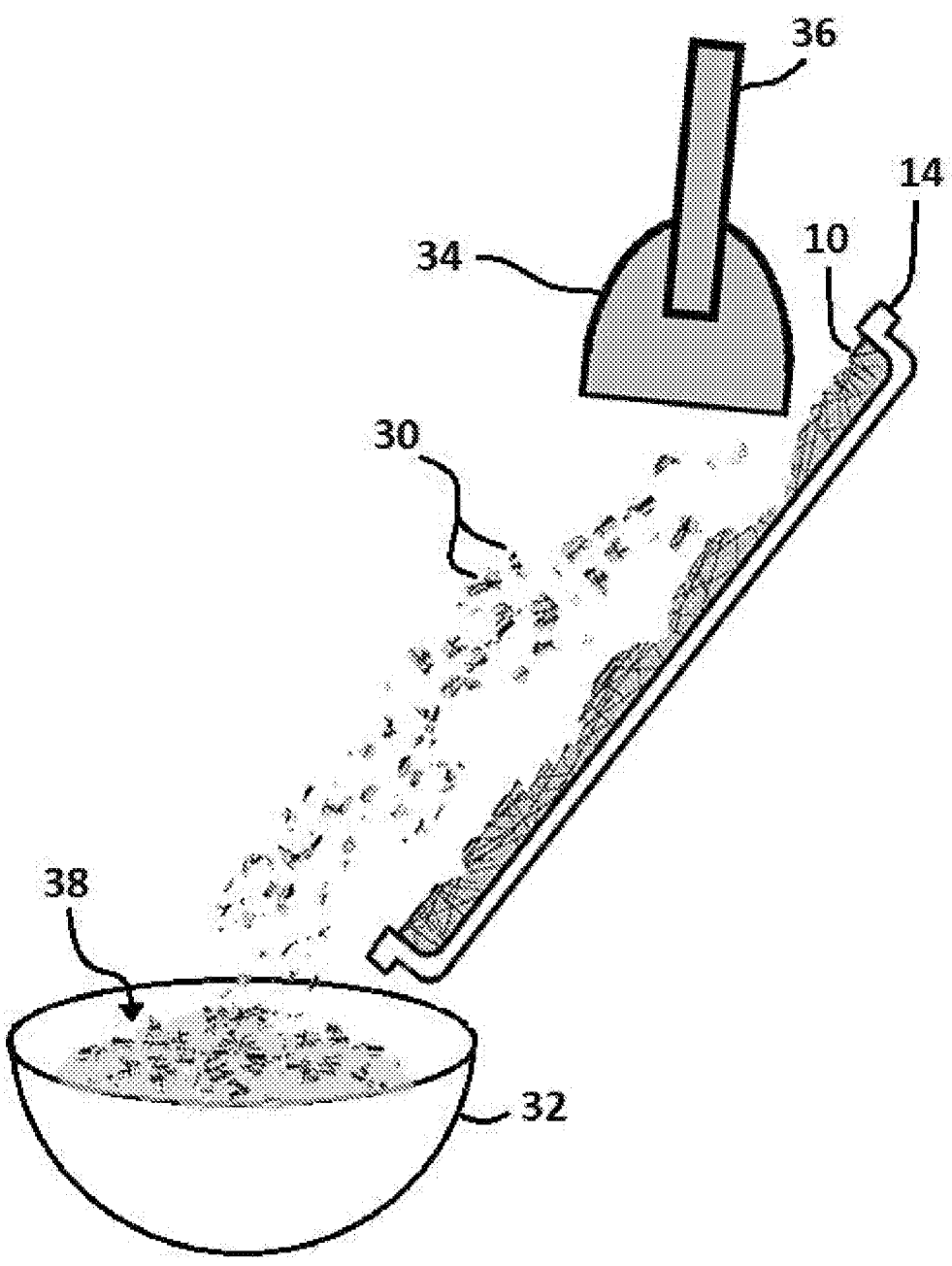
FIG. 3 is a perspective view illustrating a process step wherein the dried solidified mixture is shredded from the pan using a scraping blade to shed flakes of edible confetti of a desired thickness according to one embodiment of the invention.

FIG. 3 is a perspective view illustrating a process step wherein the dried solidified mixture 10 is shredded from the pan 14 using a scraping blade 34. It is understood that this drawing is conceptual in nature, and not is not intended to provide mechanical or dimensional precision regarding the structure of an apparatus or system for shedding flakes, or regarding the shape or size of the flakes themselves. The process step illustrated here is one that may be performed by a confectioner by hand. Using a tool 36 such as a spatula, paint scraper, knife, or chisel that has an appropriate blade 34, the confectioner manually shreds the dried planar sheet of the mixture 10 by scraping flakes 30 of the desired thickness from the planar sheet into a container 32 or onto a surface where the flakes 30 of confetti 38 may be readily collected.

An alternative shredding step may be used for shredding flakes of a desired thickness from bricks of dried solidified mixture 10. In the alternative step, not shown in the figures, the dried bricks are loaded into a grinding machine or food processor equipped with motor-driven rotary blades. The blades may then be energized for a predetermined time period, or pulsed, until flakes of the desired size are produced. In another alternative step, flakes 30 shredded in any manner may be sorted according to size using a sieve, sifter, strainer, or similar filter.

Figure 4:
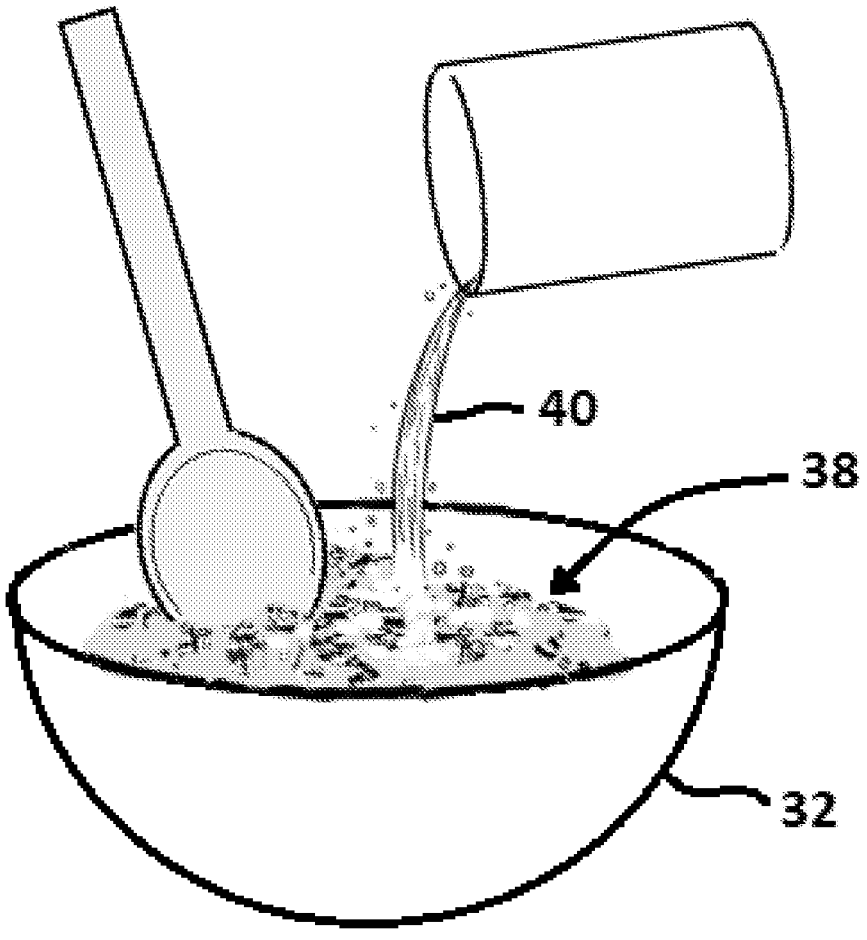
FIG. 4 is a perspective view illustrating a process step wherein edible dust is mixed into flakes of edible confetti to form a homogenous solid mixture of edible cake glitter according to one embodiment of the invention.

The next process step is illustrated in FIG. 4. In this step, confetti 38 produced and sorted in the previous step is mixed with an edible dust 40. The edible dust 40 may be a commercially available product such as a decorating powder made by the Wilton Brands company or by many others. The edible dust 40 may preferably have a light-reflecting quality so that it shines or sparkles when under light and applied to another food product. A spoon or dry brush may be used to mix the edible dust 40 into the confetti 38 until a homogenous solid mixture of edible cake glitter 50 is formed. Even though the flakes 30 of the confetti 38 have been shredded from the dried albumen-based mixture 10, it has been discovered that the edible dust readily adheres to the flakes 30 to give them a sparkling quality.

Figure 5:
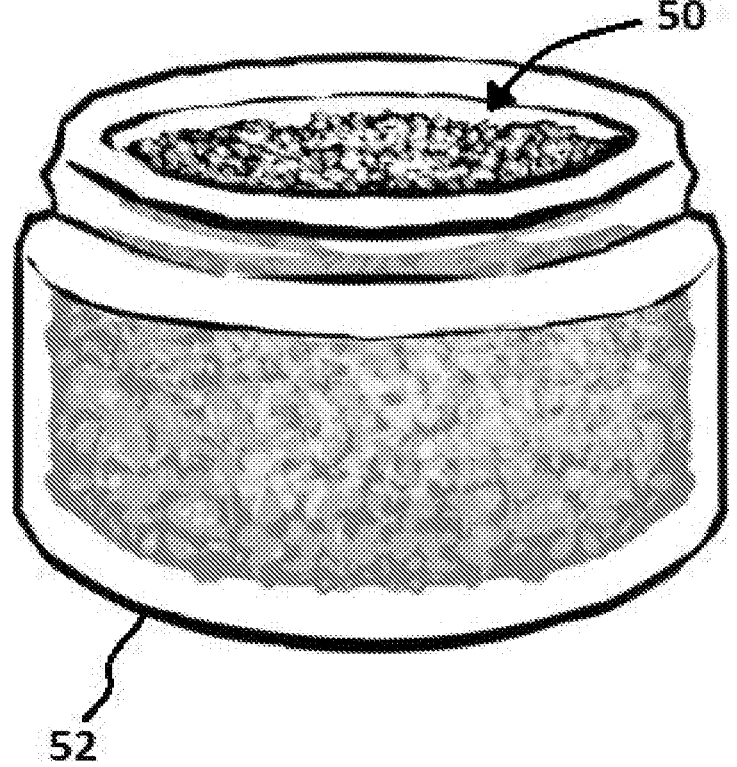
FIG. 5 is a perspective view of edible cake glitter made according to the invention and collected into a container.
Figure 6:
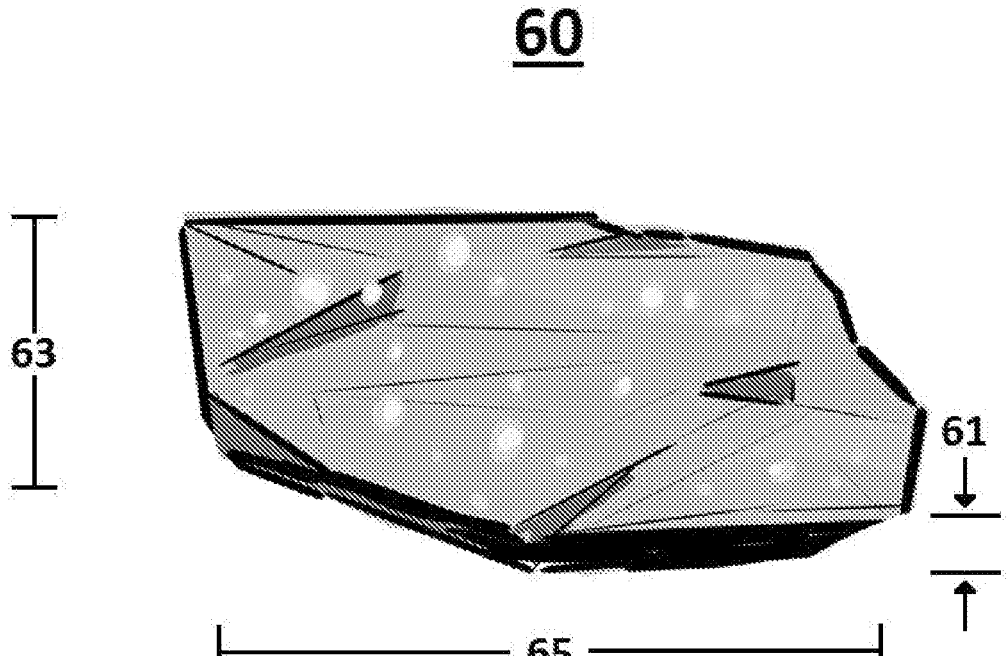
FIG. 6 is a magnified perspective view of a single flake of edible cake glitter according to one embodiment of the invention.

FIG. 5 shows a perspective view of edible cake glitter 50 made according to the invention and collected into a container 52. The container 52 is preferably a small hand-held jar having a volume of about 1 to 4 ounces and suitable for sale as and dispensing of edible cake décor. FIG. 6 shows a magnified perspective view of a single flake 60 of edible cake glitter 50 according to one embodiment of the invention. In one implementation, each flake has a preferred thickness 61 of between about 0.25 mm and about 2.0 mm. Flake width 63 or 65 in any direction may vary between about 1.0 and about 4.0 millimeters. The term "about" as used throughout this disclosure is intended to provide some reasonable amount of leeway with regard to dimensions, so that it is understood that minor variations in dimensions beyond those specified herein remain well within the scope of the invention.

FIG. 7 is a process flow diagram illustrating one embodiment of a method 700 according to the invention for making edible cake glitter. Skilled artisans will readily understand that the following steps are derived directly from the foregoing disclosure, and represent salient steps of a process for making edible cake glitter. That is, alternative or optional steps may be added to method 700, as described herein, in variations of the invention.

Method 700 begins at step 702 by combining egg white with food coloring, food flavoring, and/or sweetener, without substantial denaturation of the egg white, to form a homogeneous liquid mixture. Each of the food coloring, food flavoring, and sweetener may be added in liquid form. A preferred formulation is two dozen egg whites to between about ⅛ and about ¼ teaspoon of any of the food coloring, the food flavoring, and the sweetener. In the next step 704, the homogeneous liquid mixture is transferred into a pan, e.g. by pouring it into the pan, to a depth equal to a desired thickness of flakes. In this step care must be taken to avoid disrupting the integrity of the egg white so that the albumen proteins do not become denatured. Next, in step 706, the homogeneous liquid mixture is dried to solid form. This step may be accomplished by allowing the mixture to set in ambient temperature for whatever time period is needed to achieve solidification. Fan-forced air may also be used during this step to accelerate the drying. Then, in step 708, the dried solidified mixture is shredded using a scraping blade to produce flakes of edible confetti that have a desired thickness. The product of step 708 is an edible cake confetti. In the final step, 710, edible dust is mixed throughout the flakes of confetti to form a homogeneous solid mixture. The end product of method 700 is an edible cake glitter 50 composed of a plurality of flakes 60.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for manufacturing edible cake glitter, comprising:
   combining egg white and one or more of food coloring, food flavoring, and sweetener to form a homogeneous liquid mixture without causing substantial denaturation of the egg white;
   drying the mixture to solid form;
   grinding the dried solidified mixture into flakes.

2. The method of claim 1 wherein the combining step comprises combining the egg white with the food coloring and the food flavoring.

3. The method of claim 1 wherein the combining step comprises combining the egg white with the food coloring and the sweetener.

4. The method of claim 1 wherein the combining step comprises combining the egg white with the food flavoring and the sweetener.

5. The method of claim 1 wherein the combining step consists of combining the egg white with the food coloring, the food flavoring, and the sweetener.

6. The method of claim 1 further comprising adding edible dust to the flakes.

7. The method of claim 6 further comprising mixing the edible dust and the flakes to form a homogenous solid mixture.

8. The method of claim 7 further comprising mixing the edible dust and the flakes using a dry brush.

9. The method of claim 1 wherein the combining step further comprises combining ingredients in a ratio of about one dozen egg whites to between about ⅛ and about ¼ teaspoon of any of the food coloring, the food flavoring, and the sweetener.

10. The method of claim 1 further comprising, after the combining step and prior to the drying step:

pouring the homogeneous liquid mixture into a container to a depth greater than a desired thickness of the flakes without causing substantial denaturation of the egg white.

11. The method of claim 10 wherein the grinding step further comprises shredding the dried solidified mixture using rotary blades.

12. The method of claim 1 further comprising, after the combining step and prior to the drying step:

pouring the homogeneous liquid mixture into a pan to a depth approximately equal to a desired thickness of the flakes without causing substantial denaturation of the egg white.

13. The method of claim 12 wherein the grinding step further comprises shredding the dried solidified mixture using a scraping blade.

14. The method of claim 10 wherein the depth is between about 0.25 mm and about 2.0 mm.

15. A method for manufacturing edible cake confetti, comprising:

combining egg white, food coloring, food flavoring, and sweetener to form a homogeneous liquid mixture without causing substantial denaturation of the egg white;

pouring the homogeneous liquid mixture into a container to a depth greater than a desired thickness of the confetti without causing substantial denaturation of the egg white;

drying the mixture to solid form; and shredding the dried solidified mixture using rotary blades to form the confetti having the desired thickness.

16. The method of claim 15 wherein ingredients are combined in a ratio of about one dozen egg whites to between about ⅛ and about ¼ teaspoon of each of the food coloring, the food flavoring, and the sweetener, and wherein the desired thickness is between about 0.25 mm and about 2.0 mm.

17. Edible cake confetti formed according to the method of claim 15.

18. A method for manufacturing edible glitter flakes, comprising:

combining egg white, food coloring, food flavoring, and sweetener to form a homogeneous liquid mixture without causing substantial denaturation of the egg white;

pouring the homogeneous liquid mixture into a pan to a depth approximately equal to a desired thickness of the flakes without causing substantial denaturation of the egg white;

drying the mixture to solid form;

shredding the dried solidified mixture using a scraping blade to shed the flakes having the desired thickness; and mixing, by means of a dry brush, edible dust throughout the flakes to form a homogenous solid mixture.

19. The method of claim 18 wherein ingredients are combined in a ratio of about one dozen egg whites to between about ⅛ and about ¼ teaspoon of each of the food coloring, the food flavoring, and the sweetener, and wherein the desired thickness is between about 0.25 mm and about 2.0 mm.

20. Edible glitter flakes formed according to the method of claim 18.

* * * * *